(12) United States Patent
Kasperkiewicz et al.

(10) Patent No.: US 7,441,186 B2
(45) Date of Patent: Oct. 21, 2008

(54) SYSTEM AND METHOD FOR AUTOMATICALLY GROUPING ITEMS

(75) Inventors: Tomasz S. M. Kasperkiewicz, Redmond, WA (US); Alexander S. Brodie, Redmond, WA (US); David R. Parlin, Redmond, WA (US); Jingyang Xu, Redmond, WA (US); Kathleen M. Frigon, Bellevue, WA (US); Scott E. Dart, Lynnwood, WA (US); Po Yuan, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/957,966

(22) Filed: Oct. 4, 2004

(65) Prior Publication Data

US 2005/0165841 A1 Jul. 28, 2005

Related U.S. Application Data

(63) Continuation-in-part of application No. 10/764,248, filed on Jan. 23, 2004.

(51) Int. Cl.
 *G06F 17/00* (2006.01)
(52) U.S. Cl. ............................. 715/243; 707/5; 707/100
(58) Field of Classification Search ................. 715/200, 715/234, 243–247; 707/5, 100, 104, 202; 382/159, 218, 225
See application file for complete search history.

(56) References Cited

U.S. PATENT DOCUMENTS

| | | | |
|---|---|---|---|
| 5,533,021 A | | 7/1996 | Branstad et al. |
| 5,537,408 A | | 7/1996 | Branstad et al. |
| 5,537,491 A | * | 7/1996 | Mahoney et al. ............ 382/218 |
| 5,680,563 A | * | 10/1997 | Edelman ...................... 715/835 |
| 5,696,535 A | | 12/1997 | Rutledge et al. |
| 5,784,610 A | | 7/1998 | Copeland, III et al. |
| 5,838,317 A | * | 11/1998 | Bolnick et al. .............. 715/764 |
| 5,912,659 A | | 6/1999 | Rutledge et al. |
| 6,009,439 A | * | 12/1999 | Shiomi et al. ............ 707/104.1 |
| 6,014,706 A | | 1/2000 | Cannon et al. |

(Continued)

OTHER PUBLICATIONS

Exif 2.2 Specification (selected pages), Apr. 2002, downloaded from <"http://www.kodak.com/global/plugins/acrobat/en/service/digCam/exifStandard2.pdf">, cover page, pp. 1-3, 22, and 30.*

(Continued)

*Primary Examiner*—Doug Hutton
*Assistant Examiner*—James H Blackwell
(74) *Attorney, Agent, or Firm*—Shook, Hardy & Bacon L.L.P.

(57) ABSTRACT

A system and method for automatically grouping items, e.g., digital photographs, by analyzing the statistical distributions of at least one piece of information associated with each of the items, for instance, creation time, are provided. In one embodiment, the creation time may be converted into a numeric value and the numeric values placed in ascending order such that gaps between adjacent numeric values may be determined. Subsequently, a median difference may be determined as well as an optimum difference. The items may then be organized into groups such that an additional group is created each time the difference between the numeric value for an item and the numeric value for the adjacent item located therebelow in the ascending array is greater than the optimum difference.

19 Claims, 19 Drawing Sheets

U.S. PATENT DOCUMENTS

| | | | |
|---|---|---|---|
| 6,151,611 | A | 11/2000 | Siegel |
| 6,166,735 | A | 12/2000 | Dom et al. |
| 6,226,618 | B1 | 5/2001 | Downs et al. |
| 6,230,172 | B1 | 5/2001 | Purnaveja et al. |
| 6,324,545 | B1* | 11/2001 | Morag ................. 707/202 |
| 6,345,256 | B1 | 2/2002 | Milsted et al. |
| 6,356,567 | B2 | 3/2002 | Anderson et al. |
| 6,389,538 | B1 | 5/2002 | Gruse et al. |
| 6,398,245 | B1 | 6/2002 | Gruse et al. |
| 6,418,421 | B1 | 7/2002 | Hurtado et al. |
| 6,453,404 | B1 | 9/2002 | Bereznyi et al. |
| 6,457,103 | B1 | 9/2002 | Challenger et al. |
| 6,535,920 | B1 | 3/2003 | Parry et al. |
| 6,609,200 | B2 | 8/2003 | Anderson et al. |
| 6,611,840 | B1 | 8/2003 | Baer et al. |
| 6,615,235 | B1 | 9/2003 | Copeland et al. |
| 6,628,267 | B2 | 9/2003 | Karidis et al. |
| 6,671,389 | B1 | 12/2003 | Marzke et al. |
| 6,674,803 | B1 | 1/2004 | Kesselring |
| 6,754,715 | B1 | 6/2004 | Cannon et al. |
| 7,227,985 | B2* | 6/2007 | Ikeda et al. ............ 382/159 |
| 2003/0009469 | A1* | 1/2003 | Platt et al. .............. 707/100 |
| 2003/0069892 | A1 | 4/2003 | Hind et al. |
| 2003/0069900 | A1 | 4/2003 | Hind et al. |
| 2004/0039729 | A1 | 2/2004 | Boger et al. |
| 2004/0098363 | A1 | 5/2004 | Anglin et al. |
| 2004/0131261 | A1 | 7/2004 | Lee et al. |
| 2004/0141622 | A1 | 7/2004 | Squibbs |
| 2005/0027712 | A1* | 2/2005 | Gargi et al. ............ 707/100 |
| 2006/0104520 | A1* | 5/2006 | Kraus et al. ............ 382/225 |
| 2007/0136275 | A1* | 6/2007 | Wan ....................... 707/5 |

OTHER PUBLICATIONS

Graham, A., Garcia-Molina, H., Paepcke, A., and Winograd, T. 2002. Time as essence for photo browsing through personal digital libraries. In Proceedings of the 2nd ACM/IEEE-CS Joint Conference on Digital Libraries (Portland, Oregon, USA, Jul. 14-18, 2002). JCDL '02. ACM, New York, NY, 326-335.*

Cooper, M., Foote, J., Girgensohn, A., and Wilcox, L. 2005. Temporal event clustering for digital photo collections. ACM Trans. Multimedia Comput. Commun. Appl. 1, 3 (Aug. 2005), 269-288.*

Cooper, M. et al.,"Automatically organizing digital photographs using time and content,", Image Processing, 2003. ICIP 2003. Proceedings. 2003 International Conf. on vol. 3, Sep. 14-17, 2003 pp. III-749-III-752 vol. 2.*

* cited by examiner

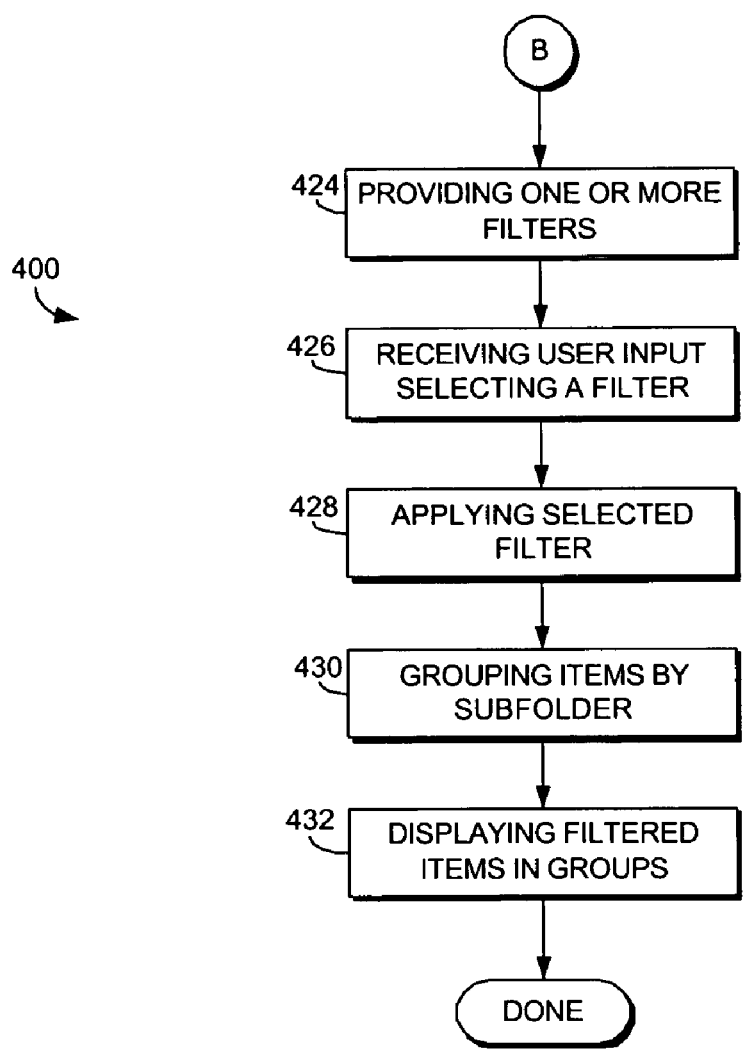

SYSTEM AND METHOD FOR AUTOMATICALLY GROUPING ITEMS

CROSS-REFERENCE TO RELATED APPLICATIONS

This application is a continuation-in-part of the commonly assigned application U.S. application Ser. No. 10/764,248 filed Jan. 23, 2004, also entitled "System and Method for Automatically Grouping Items", the contents of which are incorporated by reference herein in their entirety. Additionally, this application is related by subject matter to the invention disclosed in the commonly assigned application U.S. application Ser. No. 10/763,886, filed Jan. 23, 2004, entitled "Table of Contents Display."

STATEMENT REGARDING FEDERALLY SPONSORED RESEARCH OR DEVELOPMENT

Not applicable.

TECHNICAL FIELD

The present invention relates generally to the field of computer software. More particularly, the present invention relates to an improved user interface that presents items in accordance with default groupings. Additionally, the present invention relates to a system and method for automatically grouping items, e.g., digital photographs, by analyzing the statistical distributions of at least one piece of information associated with each of the items, for instance, creation time.

BACKGROUND OF THE INVENTION

Providing users of computers with useful and understandable interfaces for navigating and interacting with content stored upon a computer has become increasingly complex as the information stored in computing environments has grown and diversified. For example, millions of families now use digital cameras to snap hundreds of images each year. At best, people go through a laborious process of setting up separate folders and trying to logically group their many photographs. However, often the photographs are simply dumped onto the family computer into a single, disorganized directory. Making matters worse, typically digital images have non-descriptive names such as P000006.JPG.

An example of a user interface designed to facilitate user interaction with a set of digital photographs is Microsoft Corporation's Photo Table of Contents ("PhotoTOC"), described in *PhotoTOC: Automatic Clustering for Browsing Personal Photographs* (Microsoft Technical Report MSR-TR-2002-17, published February, 2002.) The PhotoTOC interface utilizes a clustering tool known as "AutoAlbum." AutoAlbum uses two techniques to group, or cluster, similar photographs. First, the clustering algorithm looks at the creation time of the files, and, according to the time the images were taken, AutoAlbum groups the photographs into categories.

The second clustering technique used by AutoAlbum involves analyzing the color content of the images through a pixel analysis. This algorithm evaluates the order in which the photographs were taken by looking for the two most similar adjacent photographs. These similar photographs are clustered together in an album.

With similar photographs clustered, the images are presented to the user in the PhotoTOC interface. PhotoTOC consists of two panes. In the right pane, thumbnails of all images are displayed in the clusters. In the left pane, one representative photograph from every cluster is shown. The representative photograph for a cluster may be chosen, for example, to be the photograph in the middle of the cluster when sorted by creation time. When the user clicks on a representative photograph, the right pane scrolls to show that same photograph in the center of the right pane. In this way, the representative photograph can facilitate navigation to a desired cluster of photographs.

While this interface improves navigation among photographs, the PhotoTOC interface does not filter the photographs and always groups the photographs according to date and pixel analysis. Accordingly, an improved user interface that allows a user to control the filtering and grouping of the items would be advantageous. Additionally, an improved system and method for grouping items based on information derived from a single criterion rather than multiple criteria would be desirable, particularly when a large set of photographs are involved and grouping based upon multiple criteria becomes increasingly complex.

BRIEF SUMMARY OF THE INVENTION

In one aspect, the present invention relates to a method for automatically grouping items, e.g., digital photographs, by analyzing the statistical distributions of at least one piece of information associated with each of the items, for instance, creation time. The method includes receiving at least one piece of information associated with each of the plurality of items (e.g., creation time), converting the at least one piece of information for each of the plurality of items into a numeric value, sorting the numeric values for each of the plurality of items into an ascending array, determining a gap (i.e., a difference) between each adjacent numeric value in the ascending array, determining a median gap ($G_m$) for the ascending array, determining an optimum gap ($G_{op}$) for the ascending array based upon $G_m$, and organizing the items into at least one group using $G_{op}$. For instance, an additional group may be created each time the difference between the numeric value for an item and the numeric value for the adjacent item located therebelow in the ascending array is greater than $G_{op}$.

Computer-readable media having computer-executable instructions for performing the methods disclosed herein are also provided.

In a further aspect, the present invention relates to a computer system for organizing a plurality of items into at least one group. The computer system includes a receiving component for receiving at least one piece of information (e.g., creation time) associated with each item of the plurality of items, a conversion component for converting the at least one piece of information into a numeric value, a sorting component for sorting the numeric values for each of the plurality of items into an ascending array, a first determining component for determining a difference between each adjacent numeric value in the ascending array, a second determining component for determining a median difference for the ascending array, a third determining component for determining an optimum difference for the ascending array based upon the median difference, and an organizing component for organizing the items into at least one group using the optimum difference. For instance, the organizing component may organize the items by creating an additional group each time the difference between the numeric value for an item and the numeric value for the adjacent item located therebelow in the ascending array is greater than the optimum difference.

BRIEF DESCRIPTION OF THE SEVERAL VIEWS OF THE DRAWING

The present invention is described in detail below with reference to the attached drawing figures, wherein:

FIGS. 4A-4D are a flow diagram showing a method for presenting items to a user in accordance with one embodiment of the present invention;

DETAILED DESCRIPTION OF THE INVENTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention provides an improved system and method for automatically grouping items, e.g., digital photographs, by analyzing the statistical distributions of at least one piece of information associated with each of the items, for instance, creation time. In one embodiment, the creation time is converted into a numeric value and the numeric values are placed in ascending order such that differences between adjacent numeric values may be determined. Subsequently, a median difference is determined and, in part using the median difference, an optimum difference is determined. The items are then organized into groups such that an additional group is created each time the difference between the numeric value for an item and the numeric value for the adjacent item located therebelow in the ascending array is greater than the optimum difference.

Having briefly described an overview of the present invention, an exemplary operating environment for the present invention is described below.

Figure 1:
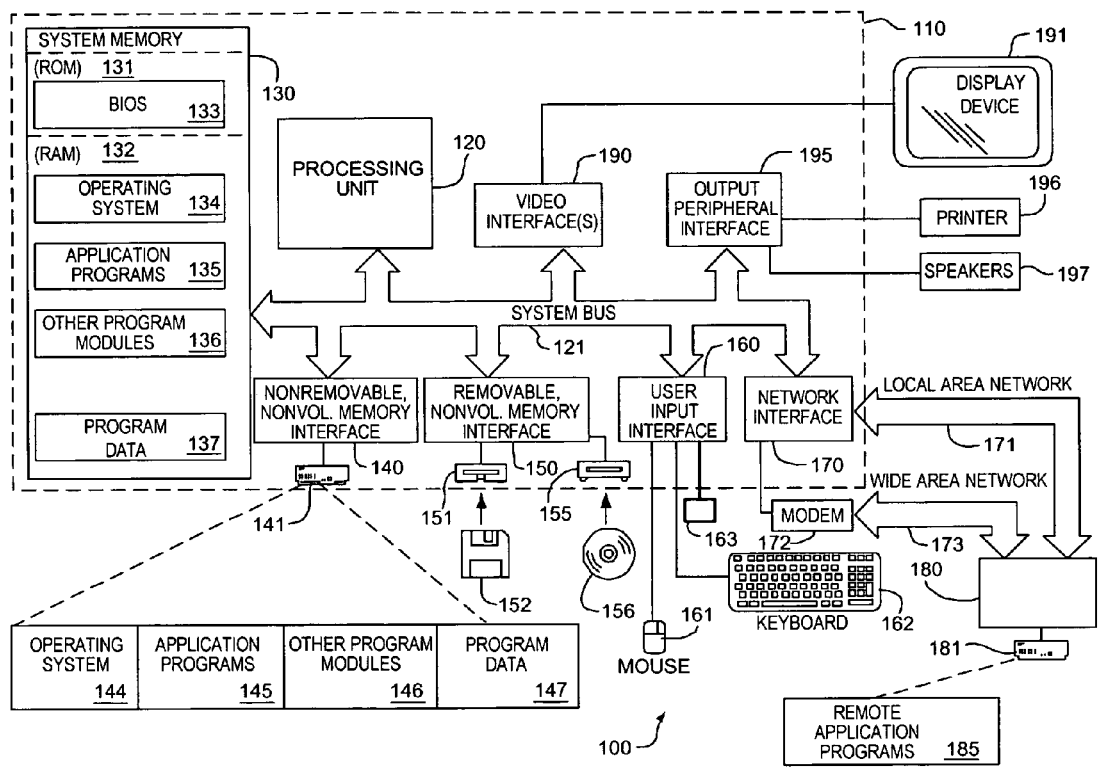
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program components, being executed by a computer. Generally, program components include routines, programs, objects, components, data structures, etc., that perform particular tasks or implement particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed-computing environments where tasks are performed by remote-processing devices that are linked through a communications network. In a distributed-computing environment, program components may be located in both local and remote computer-storage media including memory storage devices.

With continued reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program components that are immediately accessible to and/or presently being operated on by processing unit 120. By way of example, and not limitation, FIG. 1 illustrates operating system 134, application programs 135, other program components 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program components and other data for computer 110. For example, hard disk drive 141 is illustrated as storing operating system 144, application programs 145, other program components 146, and program data 147. Note that these components can either be the same as or different from operating system 134, application programs 135, other program components 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program components 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program components depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnections are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

The present invention may be described in the general context of computer-useable instructions. Computer-useable instructions include functions, procedures, schemas, routines, code segments, and components useable by one or more computers or other devices. The computer-useable instructions form an interface to allow a computer to react according to a source of input. The instructions cooperate with other code segments to initiate a variety of tasks in response to data received in conjunction with the source of the received data.

As previously mentioned, the current invention relates to an improved interface for the presentation of items on a computer. An item may be any piece of content displayable to a user or any piece of content having a graphical representation that may be displayed to a user. For example, an item may be a digital image or may be a file having an associated icon or thumbnail view.

Figure 2A:
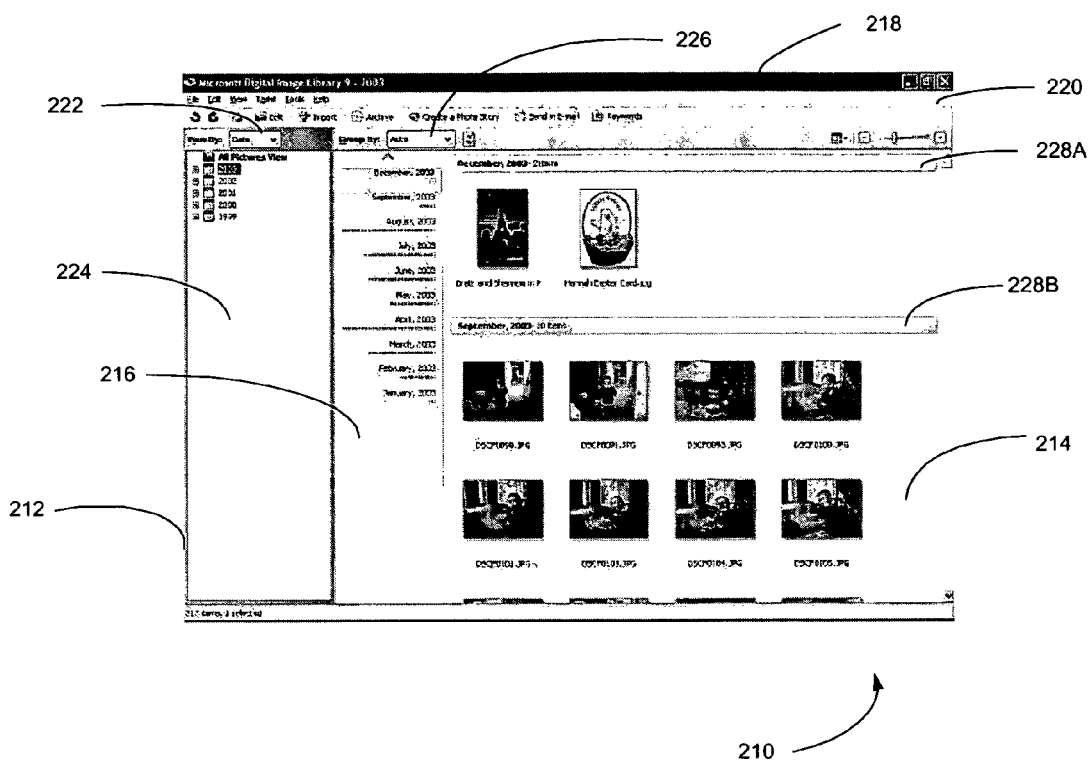
FIGS. 2A-2G are illustrative screen displays of a graphical user interface in accordance with one embodiment of the present invention in which items are presented with default groupings.

Turning to FIG. 2A, a screen display 210 provides an exemplary screen view in accordance with one embodiment of the present invention. The display 210 includes a filter view area 212 and an item presentation area 214. The display may optionally includes a table of contents 216, a title bar 218 and/or a toolbar 220, but, as will be understood by those skilled in the art, such elements are not necessary for the present invention. Furthermore, a wide variety of additional screen display elements may be included with a user interface in accordance with the present invention.

The filter view area 212 includes a view-by selection area 222 and a filter selection area 224. The view-by selection area 222 includes a drop-down menu that lists one or more view modes available to the user. Such drop down menus are well known in the art, and a user may view the available view modes, for example, by hovering a mouse pointer over the drop-down menu and clicking a mouse button.

When filtering a set of items, the user may select a desired view mode from the view-by selection area 222. The view mode dictates the type of filters that are presented in the filter selection area 224. For example, selection of the "date" view mode causes date-based filters to be displayed to the user. Those skilled in the art will recognize that a variety of view modes may be available to the user. For example, in the view-by selection area 222, the "date" view mode is selected, while "folder" and "keyword" view modes will be discussed subsequently.

The filter selection area 224 allows a user to select a filter to apply to a set of items. In one embodiment of the present invention, the highest level or broadest filters are initially displayed to the user, and user interaction allows a user to view and select more narrow filters. For example, the broadest date filter may be a yearly filter. Accordingly, in the filter selection area 224, filters for the years 2003, 2002, 2001, 2000 and 1999 are displayed to the user. If, for example, the filter for 2003 were selected, all items dated within 2003 would be selected for presentation to the user in the item presentation area 214.

Figure 2B:
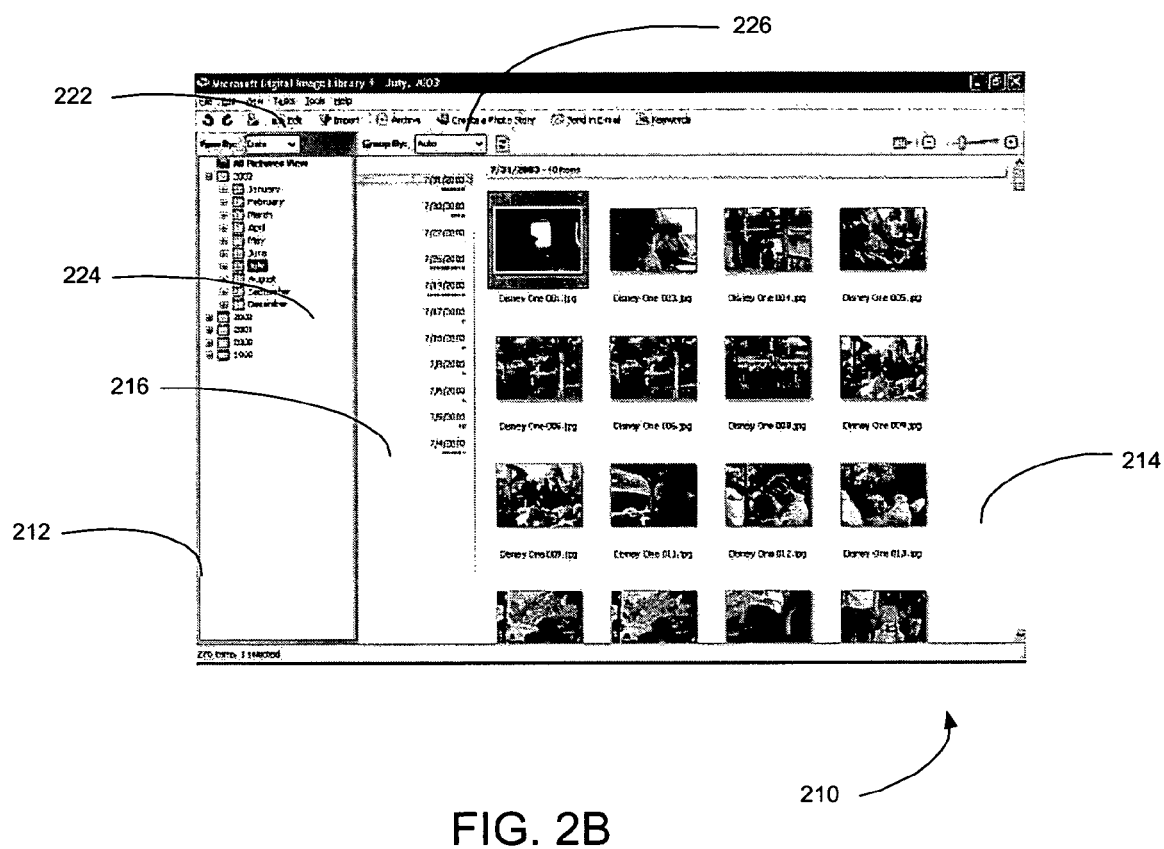
Figure 2C:
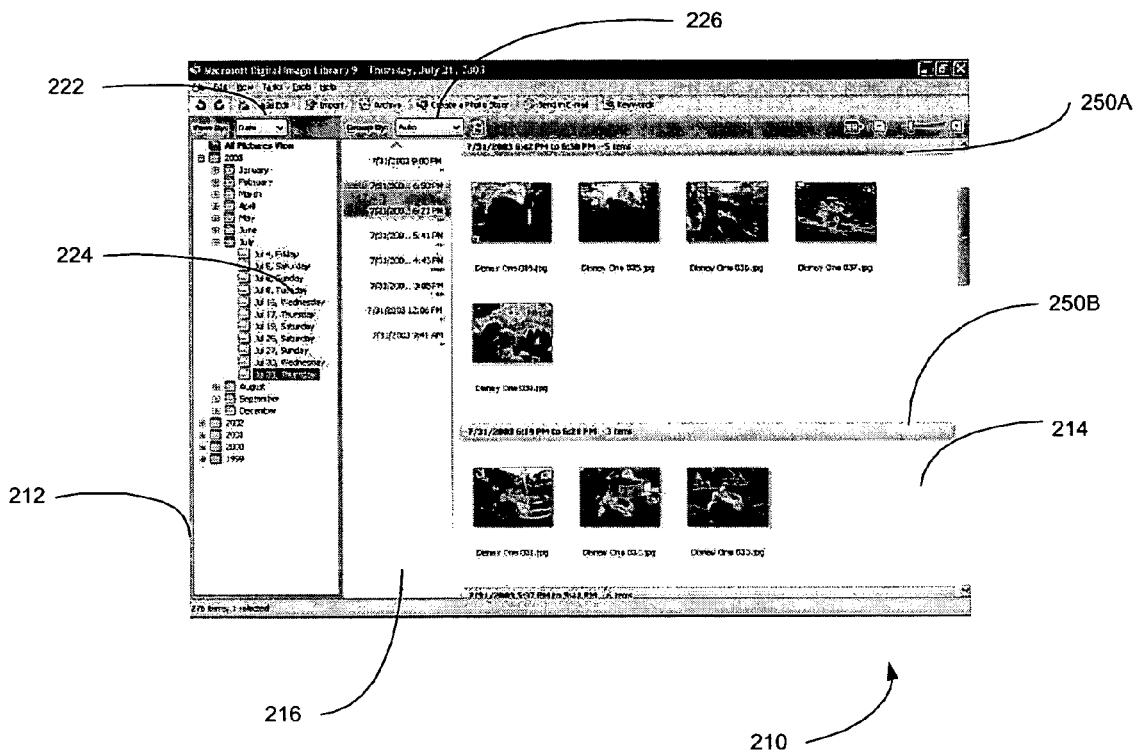

If more targeted filtering is desired, additional filters may be presented to the user. For example, monthly and daily filters may be available for each year. As shown in the filter selection areas 224 displayed in FIGS. 2A-2C, presentation of sub-filters may be accomplished by displaying a hierarchal tree-structure containing the filters. Such tree-structure displays are well known in the art, and the user may interact with the filter selection area 224 to view and select desired sub-filters. Once a filter is selected, that filter is applied to a set of items yielding a set of filtered items. For example, in the filter view area 212 in FIG. 2A, the 2003 date filter is selected; hence, items having a date within 2003 are included in the set of filtered items.

Associated with each filter or each level of filtering is a default grouping scheme that automatically divides the set of filtered items into one or more groups. This default grouping is the initial selection in a group-by selection area 226, and the default grouping may be identified as the "auto-grouping." As will be understood by those in the art, any number of groupings may be acceptable for use as an auto-grouping, and interface developers may endeavor to choose auto-groupings which provide the most utility to the user.

Those skilled in the art will recognize that a user interface in accordance with the present invention may provide the user with the ability to select alternative grouping schemes. Furthermore, the user may be given the ability to decide the manner in which the items within the groups are arranged, along with the order in which the groups are presented. For example, in date mode, the user may specify that the items are to be displayed from newest to oldest.

FIGS. 2A-2C show exemplary auto-groupings utilized by the view-by date mode. In FIG. 2A, a filter which chooses items from 2003 is selected in the filter selection area 224. As shown in the table of contents 216, the auto-grouping for this yearly filter is to group by month. Accordingly, item presentation area 214 displays images taken in 2003 in groups based on the month in which the images were created. The creation information associated with the items may be derived from a variety of sources and may be any date and/or time associated with an item. For example, the associated date information may be metadata from an external device such as a digital camera or may be data from a file system. In one embodiment of the present invention, group title bars 228A and 228B separate the groups and provide information related to group characteristics.

Similarly, in FIG. 2B, a monthly filter is selected in the filter selection area 224. As shown in the table of contents 216, the auto-grouping for this monthly filter is to group by day. Hence the item presentation area 214 displays images taken in July 2003 grouped according to the day in which the images were created.

In FIG. 2C, a daily filter is selected in the filter selection area 224. As shown in the table of contents 216, the auto-grouping for this daily filter is to group according to a time-based method. According to one embodiment, the goal of time-based clustering is to detect noticeable gaps in the creation time. A cluster is then defined as those items falling between two noticeable gaps of time. These gaps may be assumed to correspond to a change in event. The time gap detection may be adaptive—it may compare a gap to a local average of temporally nearby gaps. A gap is considered a change of event when it is much longer than the local gap average. Furthermore, time gaps may have a wide dynamic range. In order to handle this dynamic range, a gap detection algorithm may operate on gap times. The time-based clustering may first sort the items by creation time. Then, if $g_i$ is the time difference between item i and item i+1 in the sorted list, $g_N$ is considered a gap between events if it is much longer than a local log gap average:

$$\log(g_N) \geq K + \frac{1}{2d+1} \sum_{i=-d}^{d} \log(g_{N+i}),$$

where K is a suitable threshold, and d is a window size. If N+i refers to a item beyond the ends of the collection, the term is ignored, and the denominator 2d+1 is decremented for every ignored term, to keep the average normalized. Considering the table of contents 216 and heading 250A and 250B, the foregoing time-based clustering may be applied to the images dated Jul. 31, 2003 to produce the groups listed. Such groups contain variable quantities of images taken over variable gaps of time.

In another time-based auto-grouping method, rather than comparing gaps to a local gap average of temporally nearby gaps, gaps may be calculated for the entire group of images for which grouping is desired. That is, if images in a particular folder are to be grouped, a time-based grouping algorithm that operates on all images in the folder, rather than only those temporally located within a specified range on either side of a particular image, may be utilized. As more fully described below with respect to FIG. 7, the time-based algorithm of this embodiment may first sort the items by at least one piece of information, e.g., creation time. The piece of information may subsequently be converted into a numeric value and all numeric values placed in ascending order such that differences between adjacent numeric values that represent, for instance, gaps in creation time, may be determined. Next, a median gap ($G_m$) may be determined as well as an optimum gap ($G_{op}$) which relies, in part, on $G_m$. The items may then be organized into groups such that an additional group is created each time the gap between the numeric value for an item and the numeric value for the adjacent item located therebelow in the ascending array is greater than $G_{op}$. Those skilled in the art will recognize that any number of time-based clustering methods may be used in accordance with the present invention.

Figure 2D:
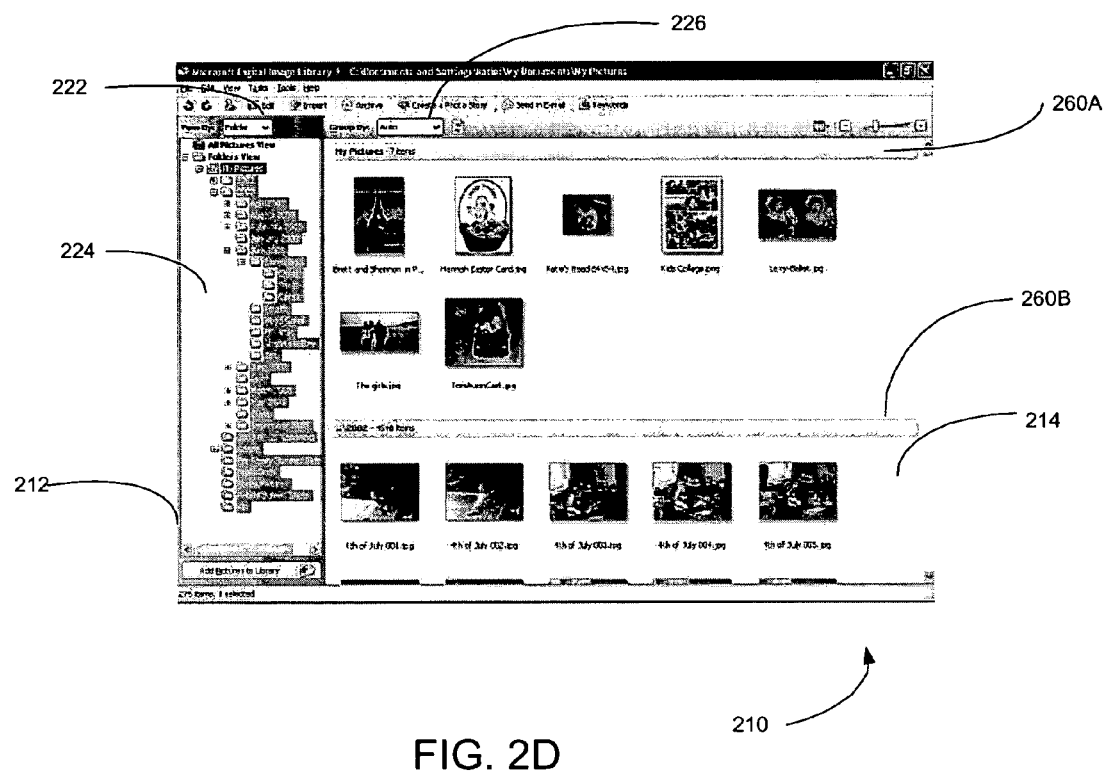
Figure 2E:
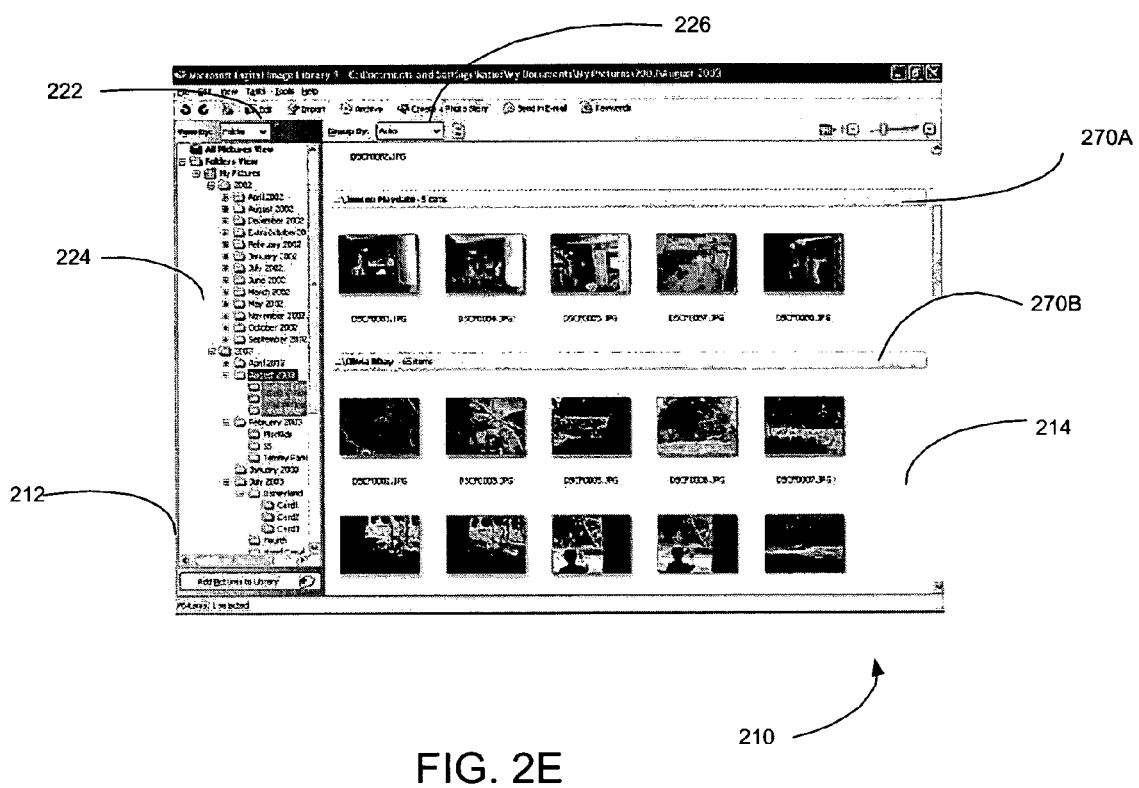

FIGS. 2D-2E show exemplary screen displays of display 210 with view-by folder mode selected in the view-by selection area 222. As will be understood by those skilled in the art, files are the basic discrete (storable and retrievable) units of information on most computer systems today. Groups of files are generally organized in "folders," and each folder is a container for its subfolders and its files.

Turning to FIG. 2D, view-by selection area 222 indicates that the view-by folder mode has been selected. The filter selection area 224 displays the folders and subfolders containing items that may be presented. These folders are presented in a hierarchal tree-structure corresponding to the manner in which the folders are stored within the file system. Such tree-structure displays are well known in the art, and the user may interact with the filter selection area 224 to view the desired folders and sub-folders.

When a desired folder is selected, the items within that folder are grouped and presented to the user in the image presentation area 214. In one embodiment of the present invention, the auto-grouping associated with the view-by folder mode groups items by subfolder. Also, items without an associated subfolder are grouped together separately. For example, the filter selection area 224 indicates that the user desires presentation of the items within the "My Pictures" folder. Accordingly, the item presentation area 214 displays items from that folder. As indicated by a title bar 260A, one of the displayed groupings includes items stored directly under the "My Pictures" folder and not in subfolders. The subsequent groupings in the item presentation area 214 contain the items stored within the "My Pictures" folder's various subfolders. For example, as shown by a title bar 260B, the items within the "2002" subfolder are displayed together in a grouping.

FIG. 2E provides another exemplary screen display of display 210 with the view-by folder mode selected. As shown in the filter selection area 224, the items within the "August 2003" folder have been selected for presentation in the item presentation area 214. As shown by the title bars 270A and 270B, the auto-groupings include a group with the contents of the "Jensen Playdate" subfolder and a group with the contents the "Olivia BDay" subfolder.

Figure 2F:
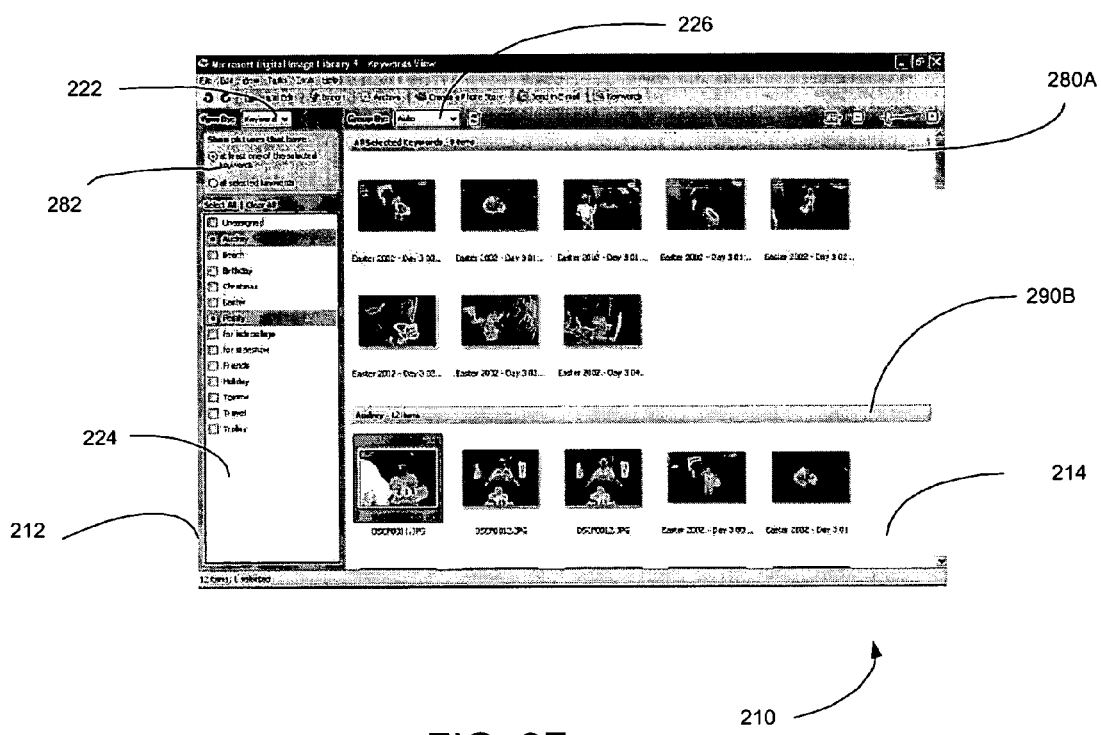
Figure 2G:
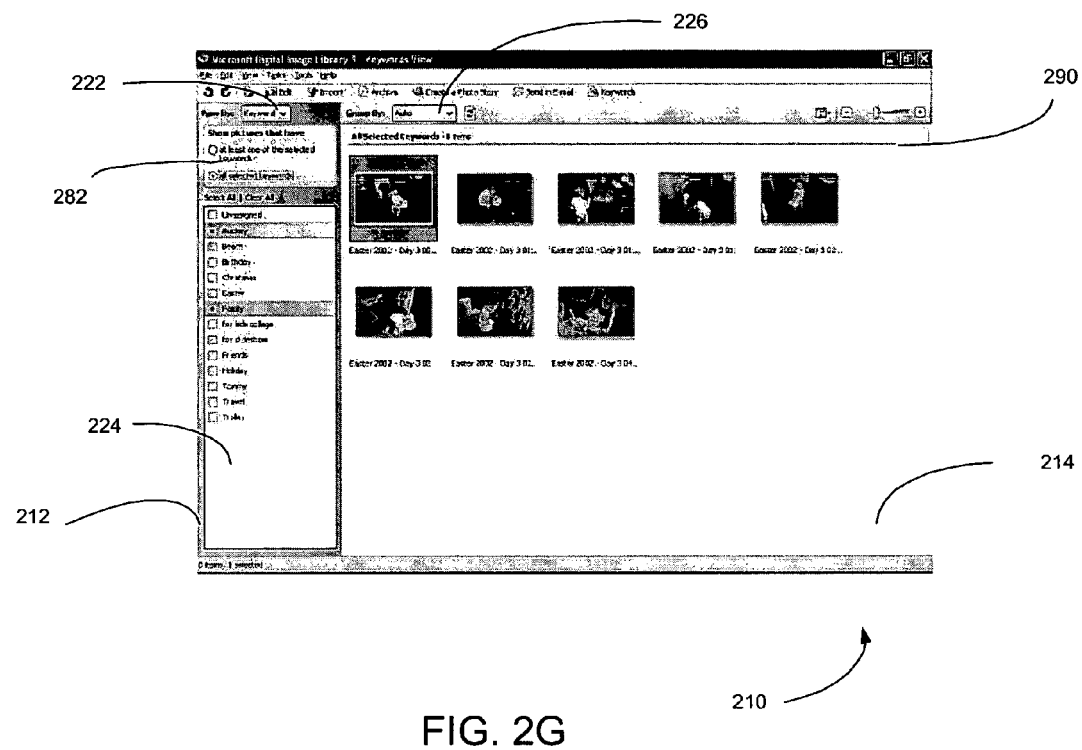

FIGS. 2F-2G show exemplary screen displays of display 210 with the view-by keyword mode selected in the view-by selection area 222. As will be understood by those skilled in the art, items may have keywords associated with them. For example, digital images may have keywords that indicate the subject matter of the images. The keywords may be associated by a user or may be associated automatically. The keywords may be stored separately from the items or may be stored along with the items as metadata.

According to one embodiment of the present invention, selection of a filter in the view-by keyword mode includes a user selection to a "Show pictures that have" selection area 282. This selection area may include the option "at least one of the selected keywords." This option specifies a filter that chooses all items having at least one of the selected keywords. FIG. 2F displays an exemplary screen display in which the "at least one of the selected keywords" option is selected in the selection area 282. As shown in the filter selection area 224, the selected keywords are "Audrey" and "Family." As a result, all items that have either the keyword "Audrey" or the keyword "Family" are presented to the user in the item presentation area 214. The auto-grouping associated with "at least one of the selected keywords" filtering is configured to group items sharing a keyword. As indicated by the title bars 280A and 280B, items associated with all the selected keywords are presented to the user as a group, while items having the associated keyword "Audrey" are presented as another group.

Turning to FIG. 2G, the "All selected keywords" option is chosen in the selection area 282. This selection results in only items associated with each of the selected keywords being presented in the item presentation area 214. For example, the eight images shown in the item presentation area 214 each have the associated keywords "Audrey" and "Family." As indicated by title bar 290, the auto-grouping associated with "all selected keywords" filtering is configured to group items in a single grouping titled "All Selected Keywords."

Figure 3:
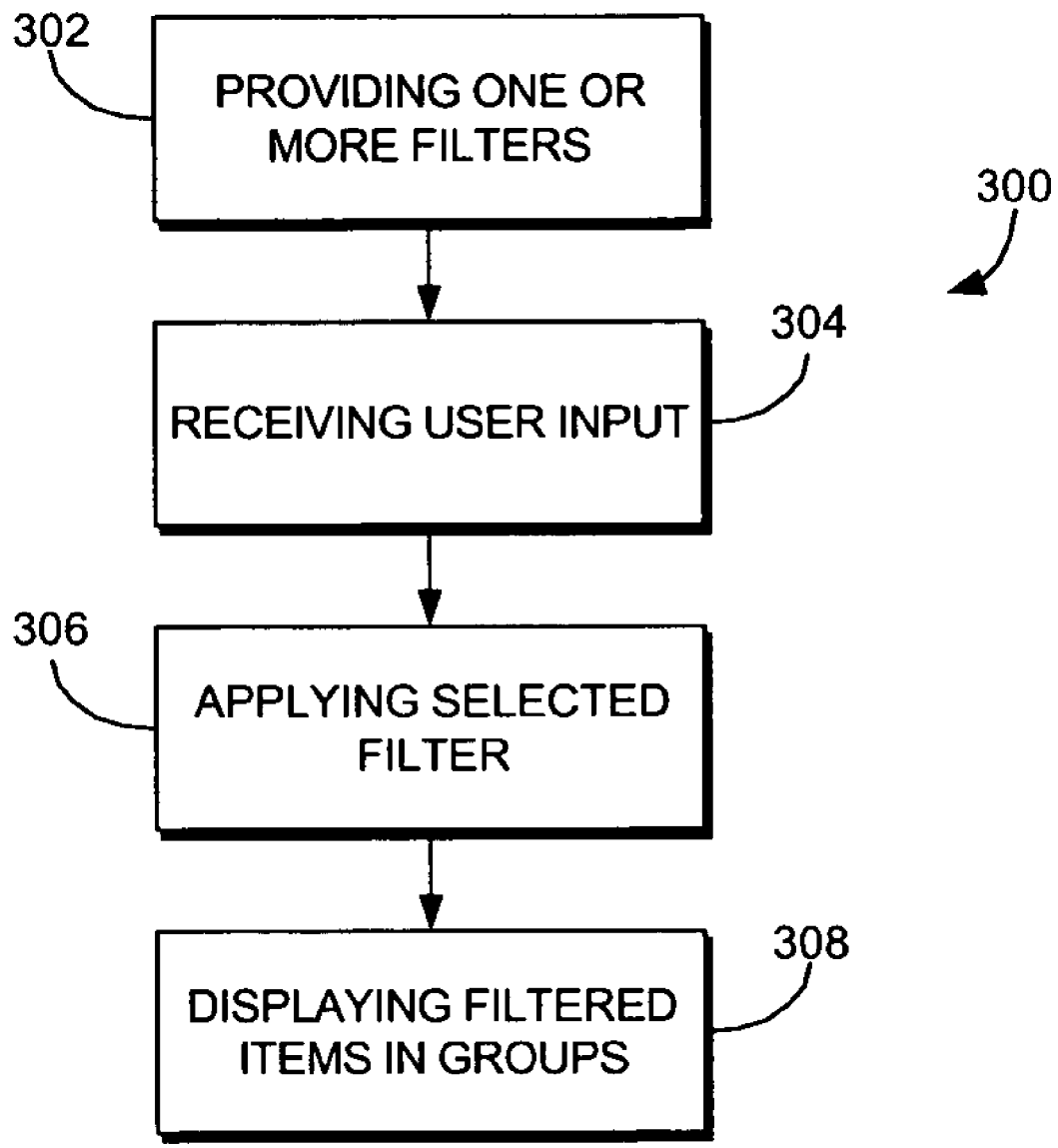
FIG. 3 is a flow diagram showing a method for presenting items to a user in accordance with one embodiment of the present invention.

FIG. 3 displays a flow diagram showing a method 300 for presenting items to a user in accordance with the present invention. Method 300 contemplates a set of items from which the presented items may be chosen. An item may be any piece of content displayable to a user or may be any piece of content having a displayable graphical representation. The set of items may all reside in one location such as a file folder or may be drawn from a variety of storage locations. Also, the set of items may share a common characteristic such as each being an image item or may have a diversity of attributives.

At 302, one or more filters are provided to the user. As will be appreciated by those skilled in the art, a filter may be any functionality which is configured to select items having a certain characteristic or set of characteristics. The filters may be provided in a variety of user interfaces. For example, the filters may be provided according to the user interface described above; a user may be given a selection of filtering modes that, upon selection, lead to a set of related filters to be provided.

At 304, the method 300 receives a user input indicating a selected filter to apply to the items. By browsing or interacting with the display of provided filters, the user is able to communicate a selection of a desired filter. For example, a user may desire all items dated May 2003. By choosing a date filtering mode, a set of date filters will be provided to the user. Via interaction with the provided filters, the user will be able to navigate to and select the May 2003 filter. At 306, the selected filter is applied to the set of items to produce a set of filtered items. As will be understood by those skilled in the art, any variety of filtering techniques are acceptable for use with the present invention.

At 308, the filtered items are presented to the user in accordance with a default grouping. Each of the filters is associated with a default grouping which automatically divides the set of filtered items into one or more groupings. A default grouping may also be associated with each level of filtering. The default grouping may be identified as the "auto-grouping." As will be understood by those in the art, any number of groupings may be acceptable for use as the default grouping. For instance, an auto-grouping for a yearly date filter may be to group by month. Those skilled in the art will recognize that the presentation of the grouped items may be accomplished in a variety of techniques or displays, including, but not limited to, the various views of display 210 shown in FIGS. 2A-2G.

Figure 4A:
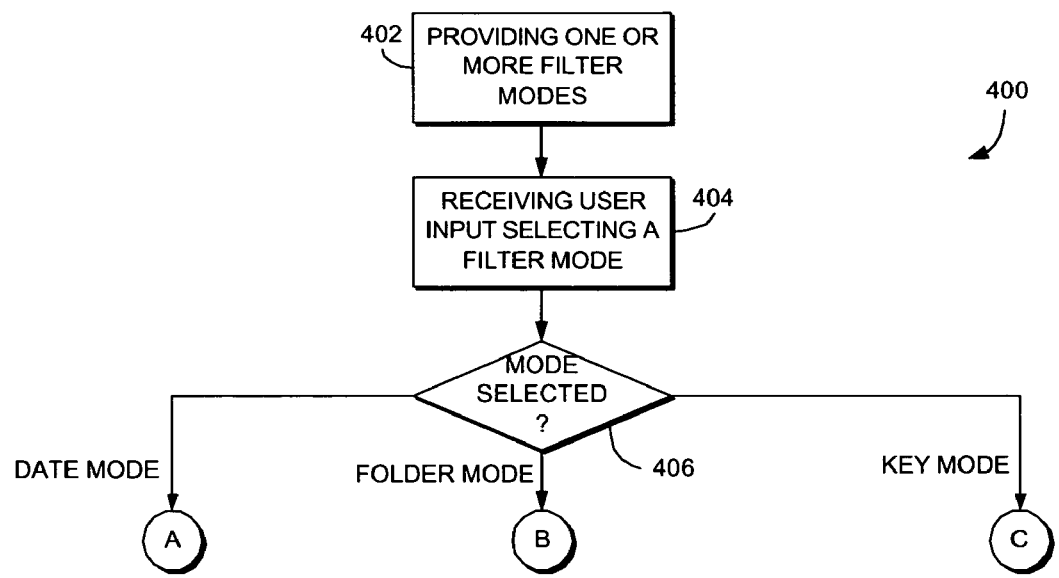

FIGS. 4A-4E display a flow diagram showing a method 400 for presenting items to a user in accordance with the present invention. In FIG. 4A, at 402, one or more filter modes are provided to a user. The filter modes dictate the type of filters that are presented to the user. For example, selection of the date filter mode causes date-based filters to be displayed to the user. Those skilled in the art will recognize that a variety of filter modes may be made available to the user. For example, method 400 includes the exemplary filter modes of date, folder, and keyword. The various filters associated with these filter modes will be discussed subsequently. At 404, a user input selecting a filter mode is received, and, at 406, a determination is made concerning which mode was selected.

Figure 4B:
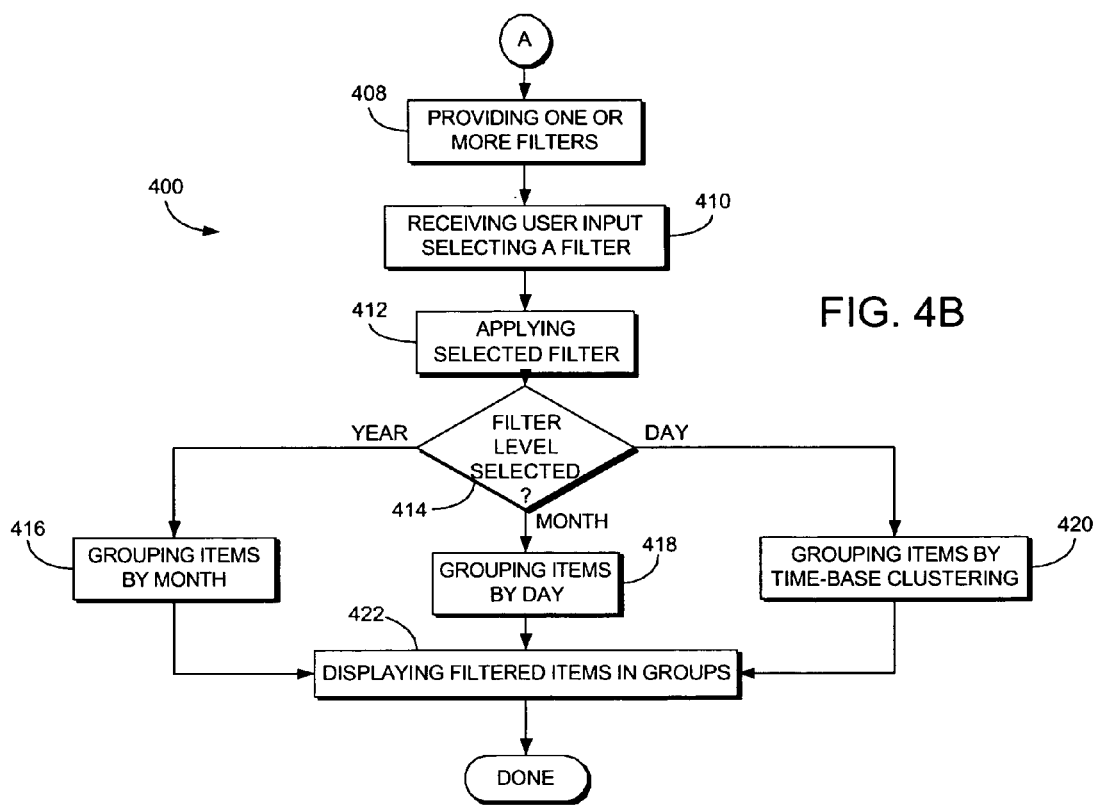

Turning to FIG. 4B and following a user selection of the date mode, a set of date filters is presented to the user at 408. For example, the user may be presented with a set of filters that allow for the selection of all the items having dates in a given year, month or day. For example, a filter configured to select all items dated August 2003 may be provided. Those skilled in the art will recognize that any variety of date-based filters are acceptable for the present invention and that a variety of user interfaces may be employed in the presentation of the filters to the user. At 410, a user input selecting a filter is received, and, at 412, the selected filter is applied to a set of items to produce a set of filtered items.

At 414, a determination is made concerning which filter level was selected. Each of the presented date-based filters has an associated filter level. In date mode, the filter level refers to the quantity of time that a selected filter utilizes to choose items. The method 400 includes the exemplary filter levels of year, month and day. For example, filters that select items from a given year are members of the year filter level.

Each filter level is associated with a default grouping or auto-grouping. As discussed previously, the auto-grouping automatically divides the set of filtered items into one or more groups. When a filter within the year filter level is selected, at 416, the selected items are grouped by month. For example, if the selected filter is configured to select all items dated in 2003, one of the groupings may be items dated in January of 2003. Similarly, when a monthly filter is selected, at 418, the items are grouped by day, and when a daily filter is selected, at 420, a time-based clustering algorithm groups the items. At 422, the filtered items are presented to the user in accordance with the default groupings. Those skilled in the art will recognize that the presentation of the grouped items may be accomplished in a variety of techniques or displays.

In FIG. 4C, following a user selection of the folder mode, a set of folder-based filters is presented to the user at 424. The presented filters represent the folders and subfolders containing items that may be presented. These folders may be displayed in a hierarchal tree-structure corresponding the manner in which the folders are stored within the file system. At 426, the method 400 receives a user input selecting a filter. The selected filter is applied at 428; the selected filter is utilized to select the items contained in the selected folder.

In folder mode, at 430, the default auto-grouping divides the filtered items according to subfolder. When the selected folder has one or more subfolders, items residing in the same subfolder are grouped together. Also, items in the selected folder but not within a subfolder are placed in a grouping. At 432, the filtered items are presented to the user in accordance with these groupings.

Figure 4D:
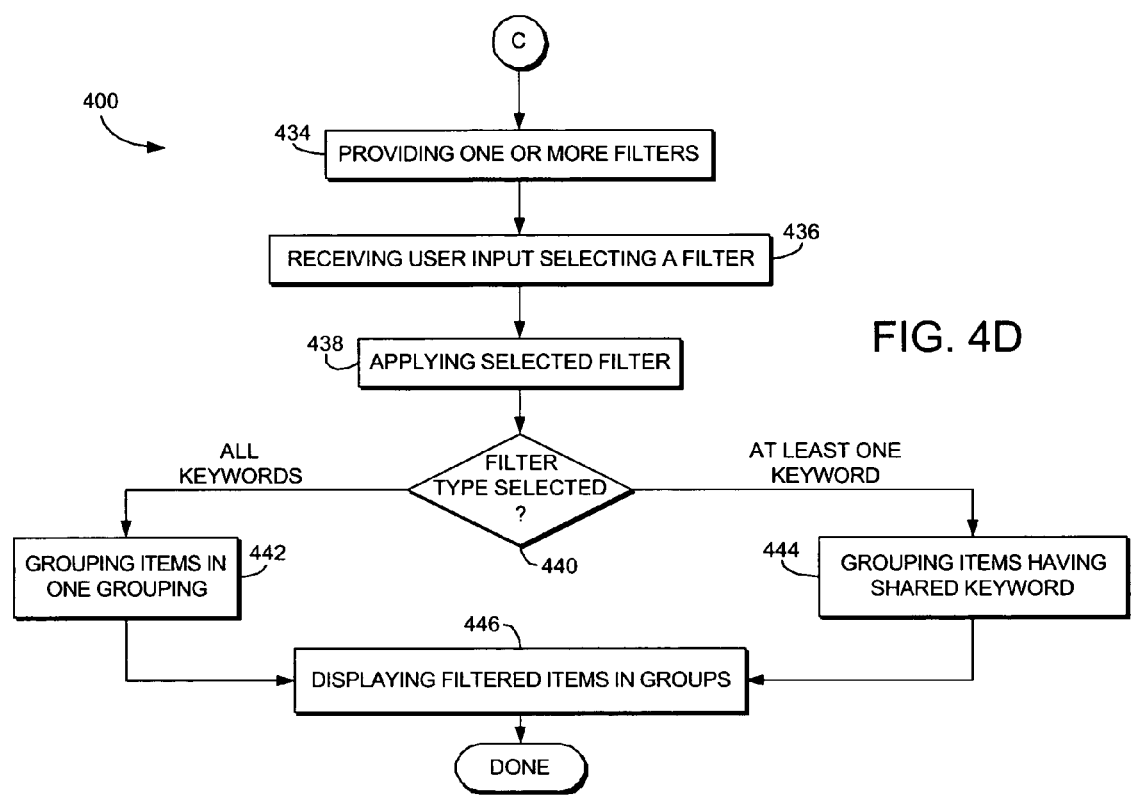

In FIG. 4D, following a user selection of the keyword mode, a set of keyword-based filters is presented to the user at 434. As will be understood by those skilled in the art, an item may have associated keywords, and keyword filters may be configured to select items based upon their associated keywords. The user may be presented with two types of keyword filters. One type of filter selects only items having all of the desired keywords, and the second type of filter selects items having at least one of the desired keywords. At 436, a user input selecting a filter is received, and, at 438, the selected filter is applied to a set of items to produce a set of filtered items.

At 440, a determination is made concerning which filter type was selected. When an "all the keywords" filter is selected, the auto-grouping associated with this type is to group all item in a single grouping. At 442, such a single grouping is applied to the filtered items. Alternatively, when the selected filter chooses items having at least one keyword, the items are grouped according to shared keywords at 444. Each selected keyword has an associated grouping which contains all of the items having that keyword. Also, one of the default groupings includes the items that have each of the desired keywords. After grouping the keywords, at 446, the filtered items are presented to the user in accordance with these auto-groupings.

Figure 5A:
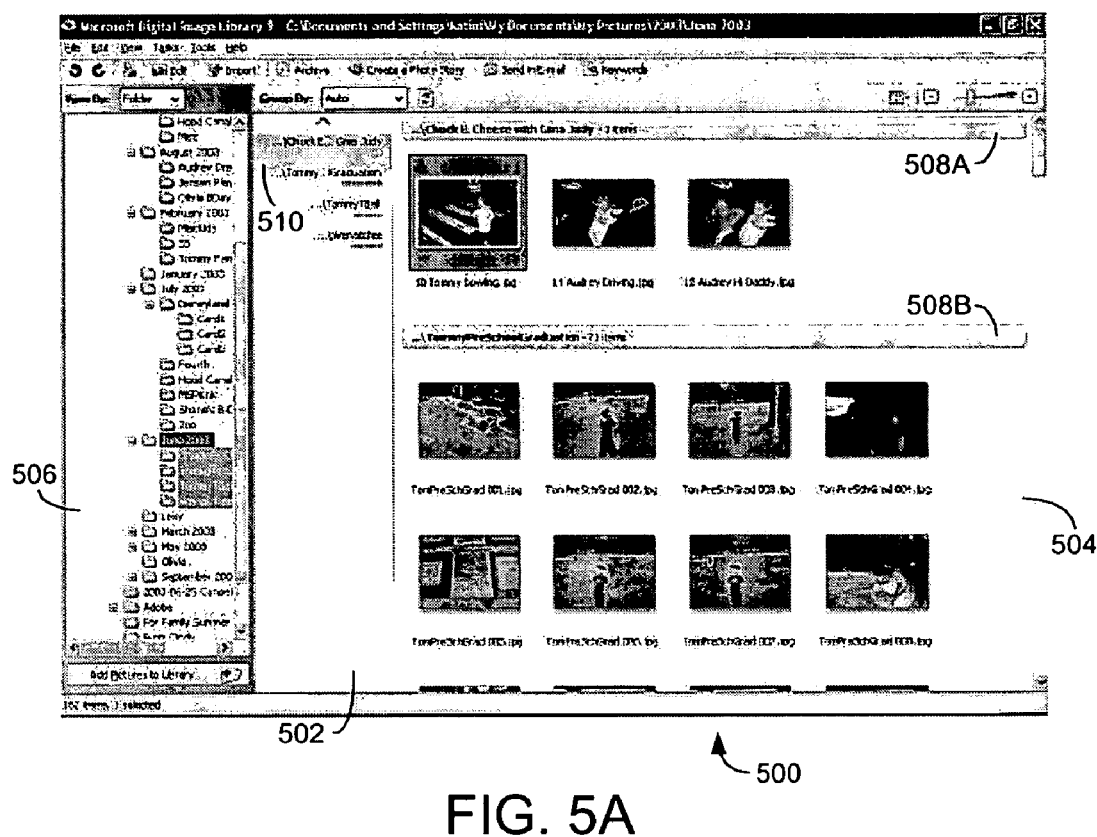
FIGS. 5A-5C are illustrative screen displays of a graphical user interface in accordance with one embodiment of the present invention in which a table of contents is presented to the user.

When presenting groups of items to a user, a variety of presentation techniques may be utilized to aid in the presentation of the items and to facilitate navigation among the content. In FIG. 5A, a screen display 500 provides an exemplary screen view in accordance with one embodiment of the present invention. The display 500 includes a table of contents area 502 and an item presentation area 504. Optionally, the display may include a filter selection area 506. According to one embodiment of the present invention, the filter selection area 506 may include a set of filters or controls that allow a user to manipulate which items or variety of items are shown in the item presentation area 504.

The table of contents area 502 may include a listing of the groups displayed in the item presentation area 504. As will be understood by those skilled in the art, the item presentation area 504 may display a wide variety of content. For example, the displayed items may be digital images or may be files having an associated icon or thumbnail view. Those skilled in the art will recognize that any variety of item groupings are acceptable for the present invention. For example, the items may be grouped according to a specified characteristic.

The table of contents 502, in presenting a listing of the displayed groups, may provide information identifying each grouping. Such information may, for example, be a descriptive title that identifies a common characteristic shared by the grouped items. For example, item selection area 506 may dictate that the items presented in screen display 500 must reside in the "June 2003" folder. If the items in this folder are grouped according to subfolder, the table of contents 502 may present each subfolder groupings by providing a list of the subfolders residing under the "June 2003" folder. Those skilled in the art will recognize that a wide variety of group listings are acceptable for the present invention. Other group listings may, for example, indicate the range of dates or times spanned by the items in a grouping or may indicate shared keywords associated with the grouped items. As shown by title bars 508A and 508B, group titles related to the group listings may be present in the item presentation area 504 along with the presented items.

Table of contents 502 may also include a display indicator 510 that shows which groups contain items currently visible to the user in the item presentation area 504. The indicator 510 may be any signal that a group contains visible items. In item presentation area 504, the entire group "Chuck E. Cheese with Gma Judy" is displayed, while only a small portion of the items in the "TommyPreSchoolGraduation" group are presented. The indicator 510 designates that these two groups have items being presented in the presentation area 504 by shading the area around these groups' listings.

Figure 5B:
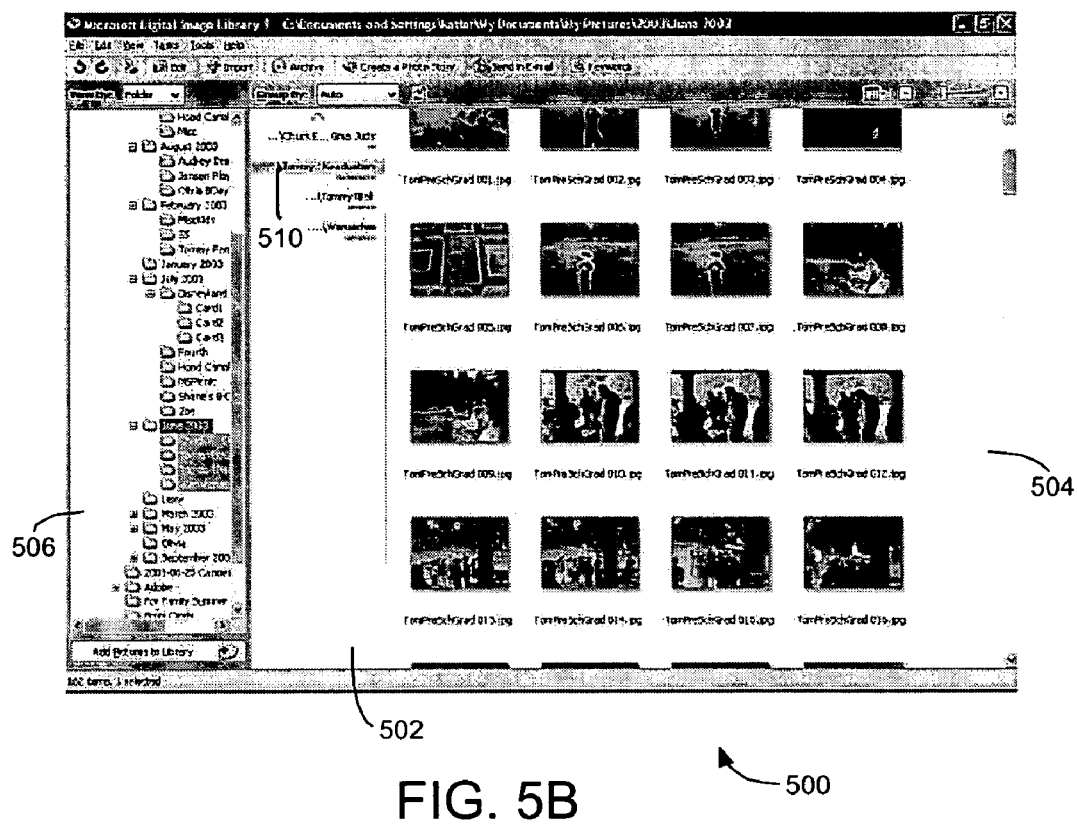
Figure 5C:
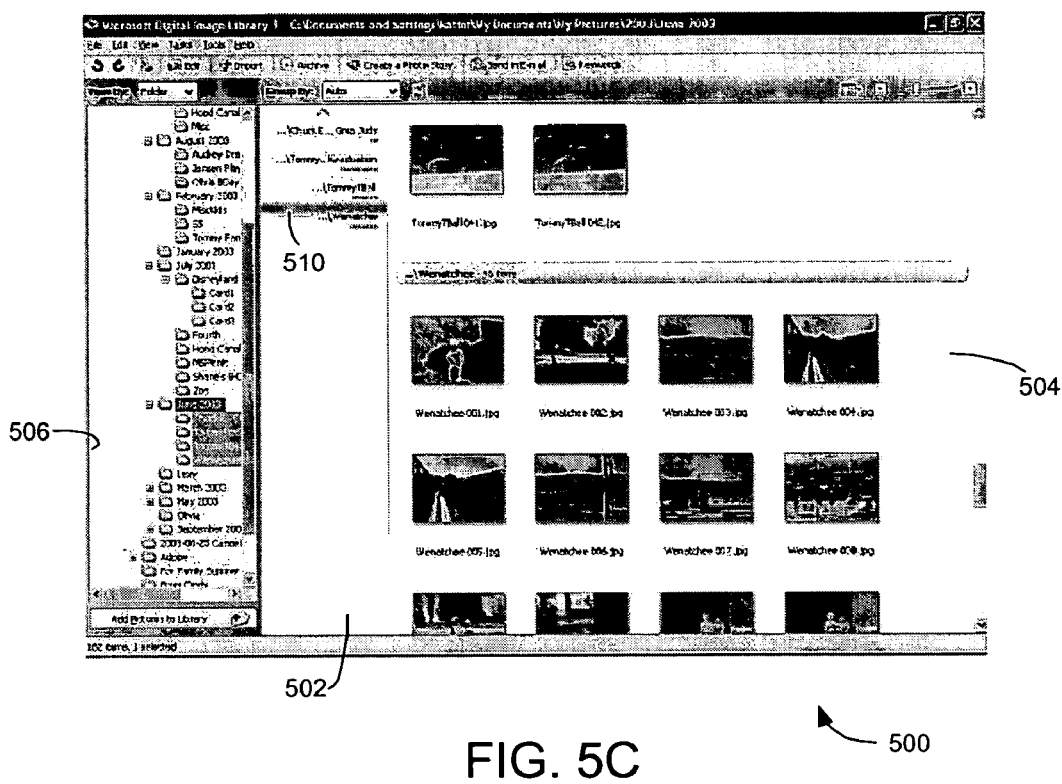

According to one embodiment of the present invention, the indicator 510 is configured to reveal the extent to which a group is displayed. As seen in display 500, for example, the entire "Chuck E. Cheese with Gma Judy" group is presented to the user in the item presentation area 504, and the indicator 510 surrounds the entire listing for this group in the table of contents 502. In comparison, only eight of the seventy-one items in the "TommyPreSchoolGraduation" group are currently displayed to the user, and the indicator 510 covers only a small portion of the "TommyPreSchoolGraduation" group listing in the table of contents 502. FIGS. 5B and 5C provide further examples of indictor 510. In FIG. 5B, only items in the "TommyPreSchoolGraduation" group are displayed to the user in the item presentation area 504, and the indicator 510 resides only upon the "TommyPreSchoolGraduation" group listing in the table of contents 502. In FIG. 5C, the lower most items of the "TommyTBall" group are displayed to the user, as well as the upper most items of the "Wenatchee" group. Thus, the indicator 510 is positioned in between the listings associated with these groups.

The table of contents 510 may also facilitate navigation among the set of filtered items. According to one embodiments of the present invention, an input received by the table of contents 510 may allow a user to navigate among the filtered items and to change the display presented in the item presentation area 504. For example, by clicking a mouse button while the mouse pointer is hovering over a desired group listing in the table of contents 510, a user may cause items in the desired group to be displayed in the item presentation area 504.

The table of contents 510 may also include an indication of the number of items in each of the listed groups. As shown in FIG. 5A, below each group listing in the table of contents 510 is a volume meter. The length or number of pixels in the volume meter for each listing is dependent upon the number of items in the listed group. For example, the volume meter associated with the three-item "Chuck E. Cheese with Gma Judy" group is short compared to the volume meter for the seventy-one-item "TommyPreSchoolGraduation" group. In general, the fewer items in a group, the shorter the volume meter, and those skilled in the art will recognize that a variety of formulas may dictate the relationship between the number of items in a group and the length of a volume meter.

A volume meter in accordance with the present invention may include a variety of attributes depending on the formula controlling the relationship between the volume of items in the group and the length of the meter. The volume meter may, for example, have a constant length for each grouping with the same number of items. The volume meter may also be configured so that the user will be able to distinguish between different small item values (e.g. a group of size 3 should appear different from a group of size 10), as well as different large values (e.g. 300 vs. 350). Third, a volume meter may contain a formula that is optimized for a given range. An exemplary formula which meets the above criteria and which is optimized for a range of 20 to 200 items is:

Volume meter length in pixels=2.4*(number of items in the group)$^{0.65}$

Using this formula, the meter may need to be truncated if the solution exceeds a desired maximum length. Those skilled in the art will recognize that any number of formulas are acceptable for use with the present invention, including linear, exponential, and logarithmic approaches.

Figure 6:
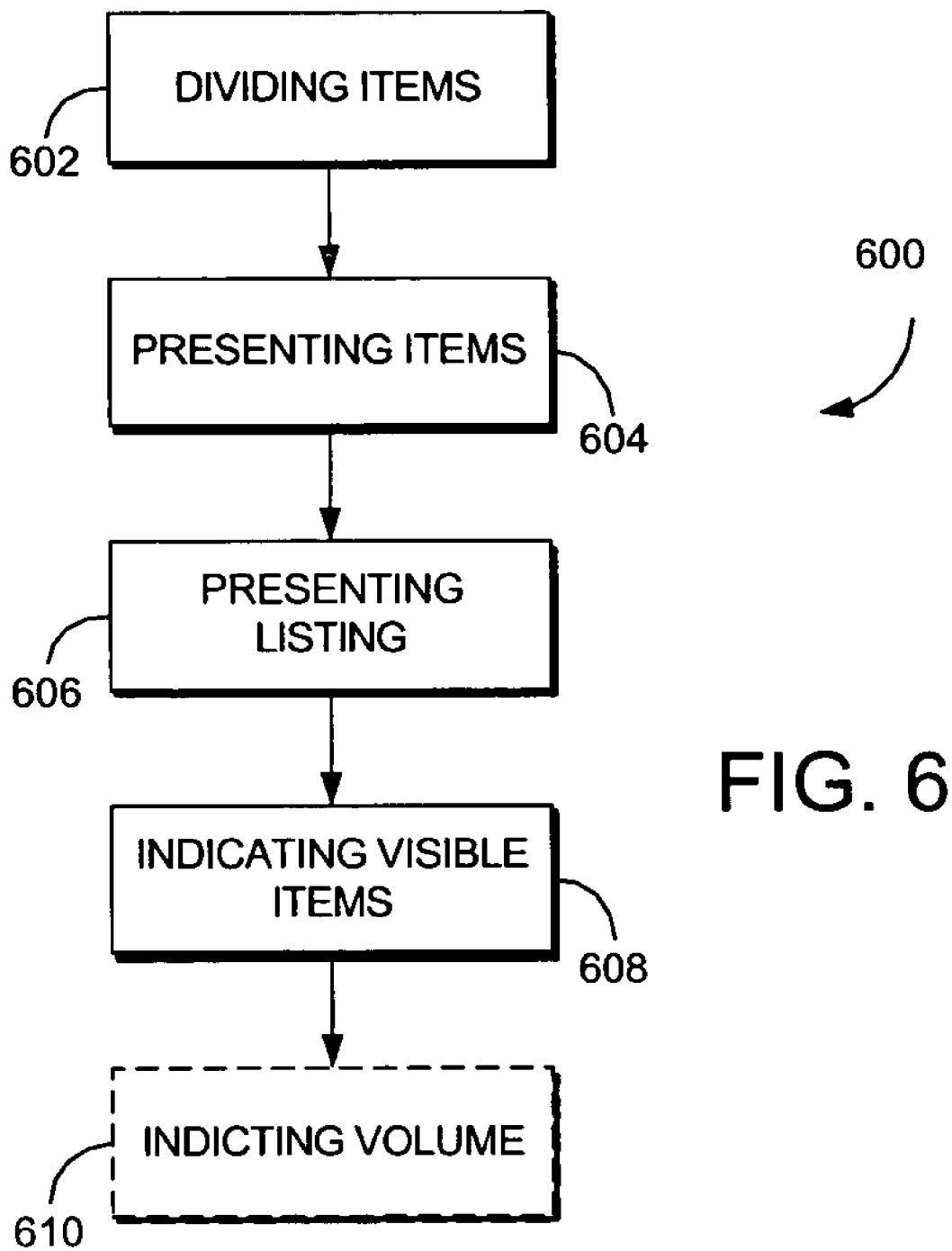
FIG. 6 is a flow diagram showing a method for presenting a set of items to a user in accordance with one embodiment of the present invention.

FIG. 6 is a flow diagram illustrating a method 600 for providing a table of contents in accordance with the present invention. At 602, the set of items is divided into one or more groups according to a selected characteristic. As will be understood by those skilled in the art, such division may group in accordance with a wide variety of characteristics and may result from filtering operations similar to those previously discussed.

At 604, the method 600 presents at least a portion of the items to the user in accordance with the groups. Those skilled in the art will recognize that such presentation may display any number of graphical representations of the items. For example, the presentation shown in the items presentation area 214 of FIG. 2A is an acceptable display contemplated by method 600. Depending on the size of the groups and the presentation area, only a portion of the items in a group may be displayed to the user or multiple groups may have displayed items.

Returning to FIG. 6, at 606 a listing of the groups is presented to the user. Any number of presentation techniques may be utilized to display this information, and a variety of listings are acceptable for use with the present invention. For example, group listings that indicate characteristics shared by a group may be displayed. At 608, the method 600 indicates which of the groups contain items visible to the user. In certain embodiments of the present invention, this indication is displayed to the user along with the group listings—groups with items currently being displayed to the user are demarcated to reflect such presentation. Those skilled in the art will recognize that a wide variety of indication techniques may be implemented by the present invention. The indication also may specify the extent to which a group is currently visible to the user. At 610, the method 600 optionally indicates the volume of items in each of the groups. This indication also may be displayed to the user along with the group listings and may include a volume meter whose length is related to the number of items in a listed group.

Figure 7:
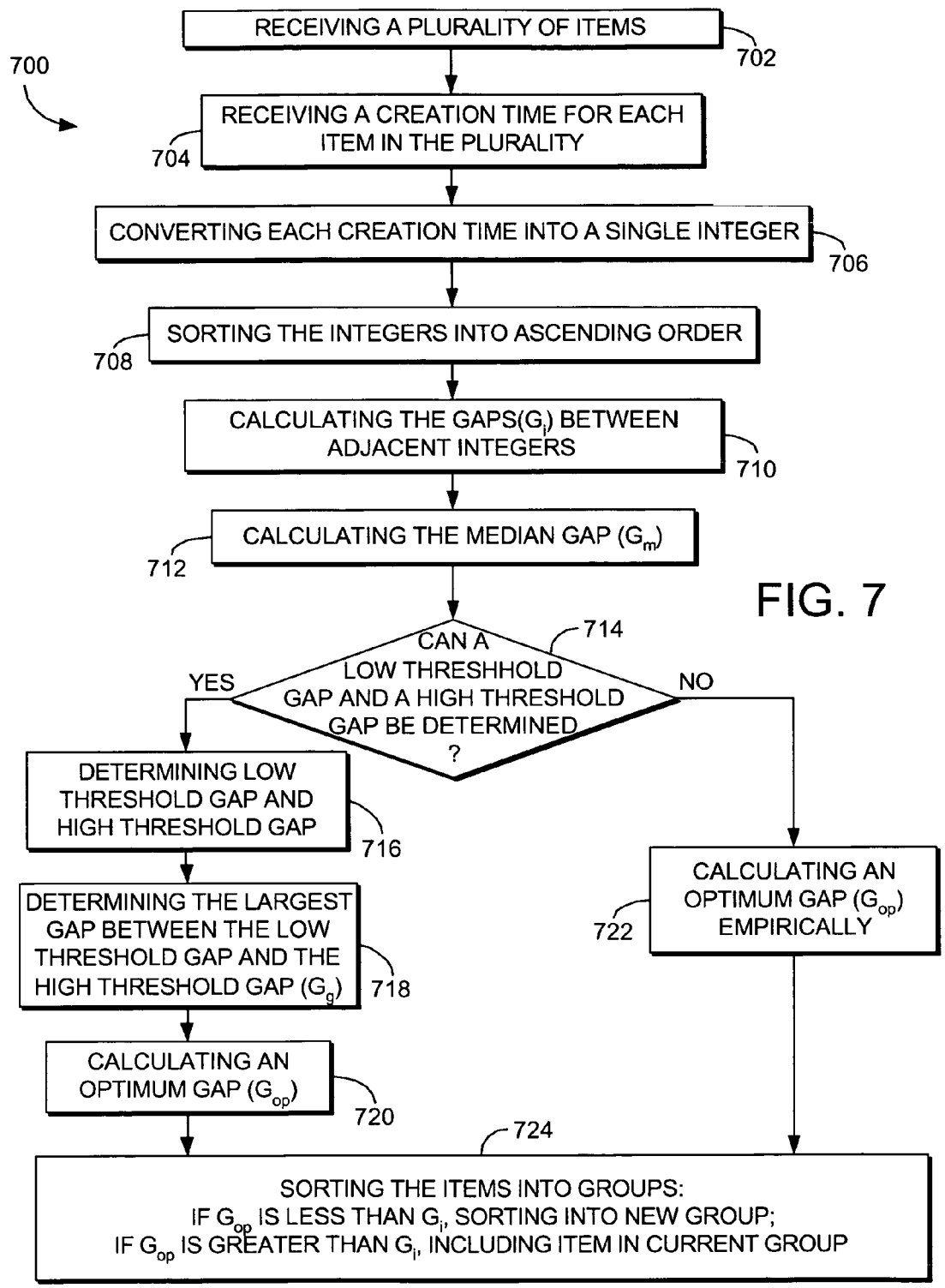
FIG. 7 is a flow diagram showing a method for grouping items in accordance with one embodiment of the present invention.

FIG. 7 displays a flow diagram showing a method 700 for organizing a plurality of items into at least one group. It will be understood by those of ordinary skill in the art that method 700 may be utilized in conjunction with or independently of any of the filters described hereinabove and is presented herein as one embodiment of an auto-grouping method.

At 702, the plurality of items to be grouped is received. Each item of the plurality may be any piece of content displayable to a user or may be any piece of content having a displayable graphical representation. Each of the plurality of items may all reside in one location such as a file folder or may be drawn from a variety of storage locations. Additionally, each of the plurality of items may share a common characteristic, such as each being an image item, or may have a diversity of attributes, such as one or more image items and one or more video image items.

Subsequently, at 704, at least one piece of information associated with each of the plurality of items, e.g., the creation time of the item, may be received. While creation time is illustrated as the piece of information on which the algorithm operates in FIG. 7, it will be understood by those of ordinary skill in the art that any piece of information stored in the metadata associated with the item may be utilized so long as the piece of information is capable of being converted into a single long integer, as more fully described below. In this regard, even in the context of creation time, the time parameter may refer only to a time of day (i.e., presuming all items to be grouped are created on the same day), or may look to additional time parameters such as day, month, year, etc.

At 706, the at least one piece of information may be converted into a single numeric value, that is, a single long integer. In the instance wherein the piece of information is creation time, the numeric value may be, e.g., in 100 ns intervals and/or may represent the number of seconds that have passed since a particular date, for instance, Jan. 1, 1601. Subsequently, as shown at 708, each of the numeric values may be sorted into an ascending array. For instance, contemplate a numeric value column wherein the smallest numeric value is the first value in the column and the largest numeric value is the last value in the column, each numeric value being of increased size as the column is viewed from top to bottom.

Subsequently, at 710, the gaps ($G_i$), i.e., the difference, between adjacent numeric values in the ascending array may be calculated. If N items are present in the set of items to be grouped, there will be N−1 gaps. Next, at 712, the median gap ($G_m$) may be calculated.

At 714, it is next determined whether or not a low threshold gap and a high threshold gap may be determined. To compute a low threshold gap, the largest log gap smaller than log $(G_m)+\log(22)$ is determined, log(22) being empirically derived as the appropriate value for use in the method. To compute a high threshold gap, the smallest log gap larger than log $(G_m)+\log(326)$ may be determined, log(326) being empirically derived as the appropriate value for use in the method.

If the low threshold gap and the high threshold gap can be determined, these values are determined at 716. Subsequently, as shown at 718, the largest gap between the low threshold gap and the high threshold gap may be determined and designated at $G_g$. The optimum gap $(G_{op})$ may then be calculated such that $\log(G_{op})$ is equal to one-half of $G_g$. This is shown at 720. If, however, one or both of the low threshold gap and the high threshold gap cannot be determined (for instance, if all measured gaps are less than 326 seconds apart), the optimum gap may be empirically calculated such that $\log(G_{op})$ is equal to $\log(G_m)+\log(40)$, log(40) being empirically derived as the appropriate value for use in the method. This is shown at 722.

Once $G_{op}$ has been determined, the items in the plurality may be sorted into groups, as shown at 724. If the gap $(G_i)$ between one item and the adjacent item in the ascending array is greater than $G_{op}$, the group number may be increased by one and an additional group may be created. However, if the gap $(G_i)$ between one item and the adjacent item in the ascending array is less than or equal to $G_{op}$, an additional group will not be created and the two items will be grouped together.

Figure 8:
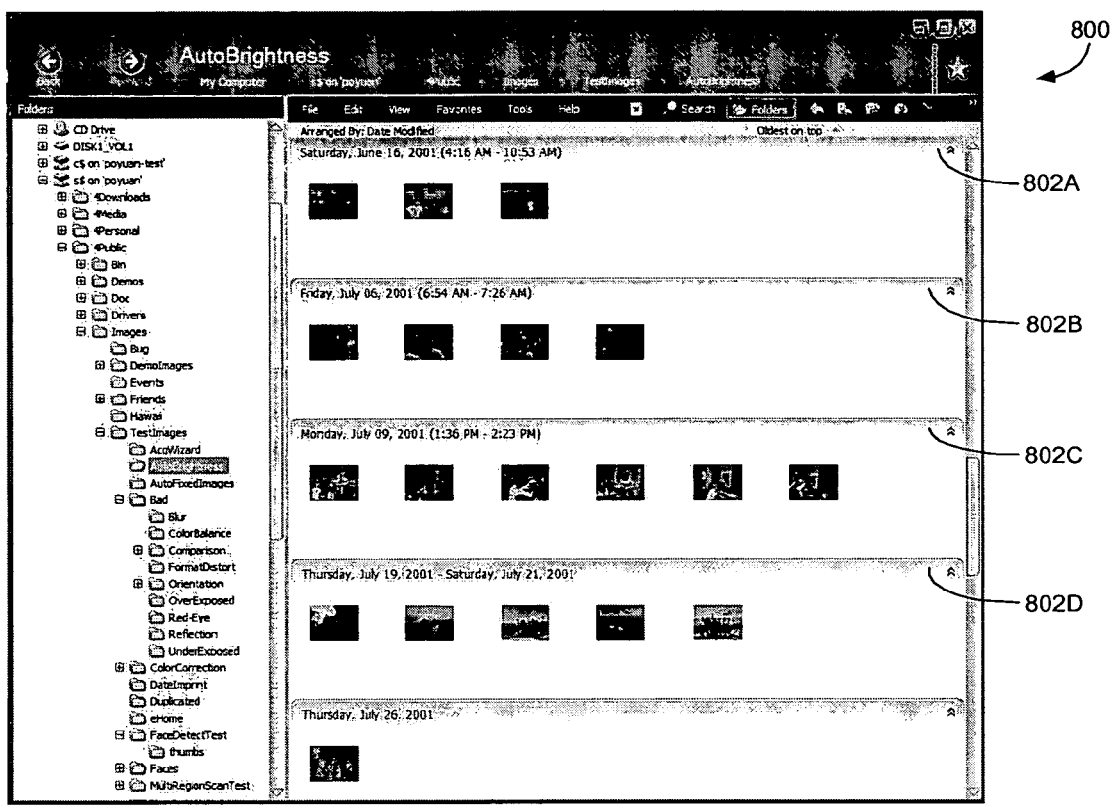
FIG. 8 is an illustrative screen display of a graphical user interface in accordance with one embodiment of the present invention in which items are presented with default groupings based upon creation time.

FIG. 8 provides an exemplary screen display 800 wherein items have been grouped in accordance with the method of FIG. 7. In accordance with one embodiment of the method of the present invention, these groupings were created by first converting the creation time of each item into the number of seconds between Jan. 1, 1601 and the creation time associated with the item. These numerical values representing the creation times were then sorted in ascending order and the gaps therebetween calculated. The natural logarithms of the gaps were subsequently calculated to determine the median values and the groupings determined based upon the above-described methodology. Group title bars 802A, 802B and 802C indicate photographs which were created on the same day but at different times have been grouped together. Group title bar 802D, however, shows that the same method may be utilized to group a series of photographs that were taken over a range of days. This illustrates that the method operates to analyze the statistical distribution of the piece of information being utilized with respect to each item, e.g., creation time, and creates dynamic groupings which recognize patterns which may be derived therefrom.

The present invention has been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

The invention claimed is:

1. A method for organizing a plurality of items into at least one group, comprising:
    receiving at least one piece of information associated with each of the plurality of items, the at least one piece of information being stored in metadata;
    converting the at least one piece of information for each of the plurality of items into a numeric value;
    sorting the numeric values for each of the plurality of items into an ascending array;
    determining a gap between each adjacent numeric value in the ascending array;
    determining a median gap for the ascending array;
    determining an optimum gap for the ascending array based upon the median gap; and
    organizing the items into at least one group using the optimum gap.

2. The method of claim 1, wherein receiving at least one piece of information associated with each of the plurality of items comprises receiving at least one time parameter associated with each of the plurality of items.

3. The method of claim 2, wherein receiving at least one time parameter associated with each of the plurality of items comprises receiving a time of creation for each of the plurality of items.

4. The method of claim 1, wherein determining an optimum gap for the ascending array comprises determining a low threshold gap and a high threshold gap.

5. The method of claim 4, wherein determining the low threshold gap comprises determining a largest gap between adjacent numeric values in the ascending array that is smaller than a sum of log(median gap) and log(22).

6. The method of claim 4, wherein determining the high threshold gap comprises determining a smallest gap between adjacent numeric values in the ascending array that is larger than a sum of log(median gap) and log(326).

7. The method of claim 4, wherein determining an optimum gap for the ascending array further comprises determining a largest gap between adjacent numeric values in the ascending array that is between the low threshold gap and the high threshold gap.

8. The method of claim 4, wherein determining an optimum gap for the ascending array further comprises determining the optimum gap such that log(optimum gap) is equal to one-half of the largest gap between adjacent numeric values in the ascending array that is between the low threshold gap and the high threshold gap.

9. The method of claim 8, wherein organizing the items into at least one group comprises creating an additional group each time the gap between the numeric value for an item and the numeric value for the adjacent item located therebelow in the ascending array is greater than the optimum gap.

10. The method of claim 1, wherein determining an optimum gap for the ascending array comprises determining the optimum gap such that log(optimum gap) is equal to the sum of log(median gap and log(40).

11. The method of claim 10, wherein organizing the items into at least one group comprises creating a new group each time the gap between the numeric value for an item and the numeric value for the adjacent item located therebelow in the ascending array is greater than the optimum gap.

12. A computer system having a processor and memory for organizing a plurality of items into at least one group, comprising:
    a receiving component for receiving a creation time for each of the plurality of items, the creation time being stored in metadata;

a conversion component for converting the creation time for each of the plurality of items into a numeric value;

a sorting component for sorting the numeric values for each of the plurality of items into an ascending array;

a first determining component for determining a gap between each adjacent numeric value in the ascending array;

a second determining component for determining a median gap for the ascending array;

a third determining component for determining an optimum gap for the ascending array based upon the median gap; and an organizing component for organizing the items into at least one group using the optimum gap.

13. The method of claim 1, wherein the third determining component determines the optimum gap for the ascending array by determining a low threshold gap and a high threshold gap.

14. The method of claim 13, wherein the third determining component determines the low threshold gap by determining a largest gap between adjacent numeric values in the ascending array that is smaller than a sum of log(median gap) and log(22).

15. The method of claim 13, wherein the third determining component determines the high threshold gap by determining a smallest gap between adjacent numeric values in the ascending array that is larger than a sum of log(median gap ) and log(326).

16. The method of claim 13, wherein the third determining component further determines the optimum gap for the ascending by determining a largest gap between adjacent numeric values in the ascending array that is between the low threshold gap and the high threshold gap.

17. The computer system of claim 12, wherein the organizing component organizes the items into at least one group by creating an additional group each time the gap between the numeric value for an item and the numeric value for the adjacent item located therebelow in the ascending array is greater than the optimum gap.

18. One or more computer-readable storage media having computer-executable instructions for performing a method, the method comprising:

receiving a creation time for each of the plurality of items, the creation time being stored in metadata;

converting the creation time for each of the plurality of items into a numeric value, wherein the numeric value is a period of time that has passed since a particular time;

sorting the numeric values for each of the plurality of items into an ascending array;

determining a gap between each adjacent numeric value in the ascending array;

determining a median gap for the ascending array;

determining an optimum gap for the ascending array based upon the median gap;

organizing the items into at least one group using the optimum gap; and creating a new group each time the gap between the numeric value for an item and the numeric value for the adjacent item located therebelow in the ascending array is greater than the optimum gap.

19. A computer system having a processor and memory for organizing a plurality of items into at least one group, the computer system comprising:

receiving means for receiving a creation time for each of the plurality of items, the creation time being stored in metadata;

converting means for converting the creation time for each of the plurality of items into a numeric value;

sorting means for sorting the numeric values for each of the plurality of items into an ascending array;

first determining means for determining a gap between each adjacent numeric value in the ascending array;

second determining means for determining a median gap for the ascending array;

third determining means for determining an optimum difference for the ascending array based upon the median gap; and organizing means for organizing the items into at least one group using the optimum gap.

* * * * *